United States Patent [19]
Burchard et al.

[11] Patent Number: 6,030,691
[45] Date of Patent: Feb. 29, 2000

[54] "ANTIFALSIFICATION" PAPER HAVING A THREAD OR BAND SHAPED SECURITY ELEMENT AND A METHOD OF PRODUCING SAME

[75] Inventors: Theo Burchard, Gmund/Tegernsee; Christian Schmitz, Fischbachau; Michael Böhm, Kirchheim, all of Germany

[73] Assignee: Giesecke & Devrient GmbH, Munich, Germany

[21] Appl. No.: 08/906,473

[22] Filed: Aug. 5, 1997

Related U.S. Application Data

[62] Division of application No. 08/360,500, Dec. 21, 1994, Pat. No. 5,688,587.

[30] Foreign Application Priority Data

Dec. 24, 1993 [DE] Germany .............................. 43 44 553

[51] Int. Cl.$^7$ ............................. B32B 3/10; B42D 15/00; B05D 5/00
[52] U.S. Cl. .......................... 428/195; 428/201; 428/209; 428/381; 428/389; 428/399; 428/457; 428/916; 283/82; 283/83; 283/111; 427/261; 427/264; 427/265; 427/407.1; 427/419.1; 427/404
[58] Field of Search .................. 283/82, 83, 85, 283/91, 94, 92, 107, 109, 110, 111, 113, 901, 902; 428/195, 201, 209, 379, 380, 381, 389, 399, 457, 458, 461, 916; 427/383.1, 384, 402, 404, 407.1, 419.1; 156/250, 269, 271, 277

[56] References Cited

U.S. PATENT DOCUMENTS

| 4,183,989 | 1/1980 | Tooth ....................................... 428/195 |
| 4,598,205 | 7/1986 | Kaule et al. .......................... 250/458.1 |
| 4,892,336 | 1/1990 | Kaule et al. ............................... 283/91 |
| 4,897,300 | 1/1990 | Boehm .................................... 428/195 |
| 4,941,687 | 7/1990 | Crane ........................................ 283/91 |
| 4,943,093 | 7/1990 | Melling et al. ........................... 283/83 |
| 5,354,099 | 10/1994 | Kaule et al. .............................. 283/85 |
| 5,388,862 | 2/1995 | Edwards ................................... 283/82 |
| 5,486,022 | 1/1996 | Crane ........................................ 283/83 |
| 5,639,126 | 6/1997 | Dames et al. ............................. 283/83 |
| 5,697,649 | 12/1997 | Dames et al. ............................. 283/83 |

FOREIGN PATENT DOCUMENTS

| 0059056 | 9/1982 | European Pat. Off. . |
| 0279880 | 8/1988 | European Pat. Off. . |
| 0330733 | 9/1989 | European Pat. Off. . |
| 1446851 | 11/1968 | Germany . |
| 1095286 | 12/1967 | United Kingdom . |

*Primary Examiner*—Marie Yamnitzky
*Attorney, Agent, or Firm*—Bacon & Thomas, PLLC

[57] ABSTRACT

An antifalsification paper having a security element in the form of a thread or band that consists of a translucent plastic film with an at least partly opaque coating. The coating has translucent areas in the form of visually and/or machine readable characters or patterns that form first information. In addition second information in the form of visually and/or machine readable characters or patterns is disposed on the plastic film, differing from the first information with respect to its size and/or visual impression.

14 Claims, 5 Drawing Sheets

"ANTIFALSIFICATION" PAPER HAVING A THREAD OR BAND SHAPED SECURITY ELEMENT AND A METHOD OF PRODUCING SAME

This application is a division of application Ser. No. 08/360,500 filed Dec. 21, 1994, now U.S. Pat. No. 5,688,587 granted Nov. 18, 1997.

FIELD OF THE INVENTION

The present invention relates to an antifalsification paper having a security element in the form of a thread or band which consists of a translucent plastic film with an at least partly opaque coating, the coating having translucent areas in the form of visually and/or machine readable characters or patterns which form first information.

DESCRIPTION OF RELATED ART

Bank notes and other monetary papers such as checks, shares, traveler's checks, check and credit cards, as well as passports and identity cards are frequently protected against forgery by the insertion or application of so-called safeguarding threads. Papers of this type will be referred to in the following as antifalsification papers. The safeguarding threads used for this purpose are made of a great variety of materials in the form of threads or bands with a width of 0.4 to 10 millimeters. They predominantly consist of plastic films which are metal-coated, printed, dyed or provided e.g. with pigment substances. Furthermore it is also known to give safeguarding threads magnetic, fluorescent, X-ray absorptive or other properties by selecting corresponding substances.

Metal-coated threads have recently been used increasingly for antifalsification papers. These threads, which are disposed partly or wholly within the paper, are almost invisible in incident light. This is because the light rays penetrating the upper paper layer are completely reflected on the metallic surface and scattered diffusely within the paper. In transmitted light, on the other hand, such threads appear as black stripes clearly standing out from their surroundings. Threads of this type cannot be imitated by a print on the paper. To increase the resistance to forgery further it has also been proposed that such aluminized safeguarding threads be provided with microwriting (DE-A 14 46 851). However this has proved to be rather impractical since the writing is not recognizable on the otherwise opaque safeguarding thread in transmitted light and very difficult to recognize in incident light. Even when such safeguarding threads are incorporated in the paper as so-called window threads, as described in EP-A 0 059 056, the microprint remains difficult to find in the printed paper.

EP-A 0 279 880 discloses a safeguarding thread made of transparent film material on which metallically lustrous microcharacters are provided. The microcharacters are not recognizable in incident light since the thread is embedded within the bank note. In transmitted light, on the other hand, only the characters are recognizable since the safeguarding thread itself is of transparent design. The viewer thus sees in transmitted light only some writing running through the bank note that is difficult to find due to the smallness of the characters, its embedding in the paper stuff and a printed image possibly located thereabove. On the other hand, the small size of the microcharacters makes it difficult to imitate such a thread.

In a further safeguarding thread known from EP-A 0 330 733, a translucent plastic film, which can be colored, is provided with an all-over opaque, in particular metallic, coating in which gaps in the form of characters or patterns are produced. The thread is recognizable in the document in transmitted light as a dark stripe, while the characters and patterns stand out in readily recognizable fashion as light, possibly colored areas from their direct surroundings, the opaque thread coating, and additionally from their more remote surroundings, the document material. The thread is thus very easy to find in the document while the characters are readable at any time without aid if they are large enough.

Metalized safeguarding threads are produced by vaporizing a transparent film over a large surface with a thin metal layer, e.g. of aluminum. To produce metallic characters one prints the vaporized film with the microcharacters using an acidproof ink by the method described in EP-A 0 279 880 and then subjects it to an etching process by which the unprinted areas are removed, leaving the metallic characters on the transparent film.

Gaps in the shape of characters can be produced in the coating of the film for example, as described in EP-A 0 330 733, by a washing process wherein the characters are printed on the film with a soluble ink before vaporization. After the coating process the soluble ink and the metal layer located thereabove are removed in a suitable solvent bath.

The invention is based on the problem of producing an antifalsification paper having a thread- or band-shaped security element that offers high protection against forgery while simultaneously ensuring good recognizability of the security element and the characters without technical aids.

SUMMARY OF THE INVENTION

This problem is solved by the features in the characterizing part of the main claim. Developments of the invention and a method for producing such an antifalsification paper are the object of dependent and independent claims.

The invention is essentially characterized by providing on a safeguarding thread at least two types of information which, disposed on the thread side by side or combined with each other in another way, ensure high resistance to forgery of the thread and thus also of the antifalsification paper at the same time as good recognizability.

In a first embodiment the inventive antifalsification paper has a safeguarding thread made of transparent plastic that bears so-called negative writing, i.e. an opaque, in particular metallic, coating with gaps in the form of characters or patterns, in spaced apart areas. In the metal-free intermediate areas there is any desired print which is visually recognizable without additional aids. This thread is preferably incorporated in the paper as a window thread. The negative writing offers good copy protection due to the described incident light/transmitted light effect in the paper since this behavior cannot be imitated either with a copying machine or by a print. In addition the opaque areas permit easy localization of the thread in the document since they offer good contrast with the surroundings so that the print disposed between the opaque areas is also very easy to find and to read. This print, referred to in the following as positive writing, makes forgeries difficult that are based on imitation of the superficial optical impression of the thread in the area of the windows. This is because particularly with the metallic negative writing the optical impression is dominated primarily by the metallic luster of the thread, so that the gaps and the information represented by them move into the background.

Furthermore the application of different production techniques for positive or negative writing, which must be coordinated so that they do not impair each other, leads to a further increase in the resistance to forgery. The negative writing is produced for example by a washing process as known from EP-A 0 330 733. The printed image is first printed on a film as it is to appear as a negative image in the opaque coating later, and the opaque coating, e.g. a metal coating, is only applied in a second method step. For applying the printed image one use inks or lacquers that have low adhesion to the film and/or to the coating so that the coating can be removed either alone or together with the ink. One preferably uses inks that can be dissolved chemically again under the metal coating. The visually readable print must be applied in the intermediate areas in exact register with the negative writing areas produced in this way. This printing operation can be integrated in the production process of the negative writing by first printing the carrier film of the security element with a washfast ink in accordance with the positive print recognizable later, and then applying the removable printed image. Alternatively one can also print on the two printed images simultaneously in one printing operation. In the washing operation performed after coating only the soluble ink is removed.

However the background of the negative writing can also be printed, e.g. with a metallic ink. If this printed negative writing is combined with a complicated multicolor positive print according to the above statements one also obtains a security element difficult to imitate. For example it is conceivable to design the thread in a nationally specific way, the negatively represented information rendering the country's name and the positively printed information the particular national flag in all details in accordance with the original.

The special protective effect of the inventive security element thus results from the combination of the negative writing, which cannot be copied due to the incident light/ transmitted light effect, with further information which is easy to recognize in particular in incident light. The same protective effect is utilized in a further preferred embodiment wherein adjacent areas on a transparent plastic thread are provided with large, easy-to-read negative writing and with small negative writing visually difficult to resolve. In this connection "large" refers to a type height of at least 1 millimeter and a line width of at least 150 microns; "small" to the accordingly smaller values.

If the gaps in the negative writing are too large this improves legibility but worsens the incident light/ transmitted light effect. By the combination of small and large negative writing the security element according to the invention offers the advantage of good readability while simultaneously maintaining high resistance to forgery. Due to the large characters also recognizable in incident light, forgeries are furthermore avoided that only imitate the metallic luster effect.

Suitable opaque coating materials include not only metal layers but also other nonmetallic layers contrasting with the surroundings in terms of color and/or gray tone when viewed in transmitted light, e.g. opaque, preferably white, color layers, metallically lustrous layers such as titanium nitride or interference layers as are known for example from U.S. Pat. No. 3,858,977.

The plastic substrate can also be provided with nonopaque, preferably transparent, inks in various colors and tints. However the film can also be dyed with suitable colorants in such a way that the transparency is maintained in a partial range of the visually accessible spectrum. Luminescent inks can be used to improve the visual impression of the thread material even further and make it more effective. The luminescent inks can either be colorless in the nonexcited state or have a body color preferably differing from the color of the emitted light. The characters or patterns then only appear colored in the excitation light or change their color when the thread is viewed e.g. under UV light. Several luminescent substances emitting in different colors increase both the possibilities of design and the resistance to forgery since each individual luminescent substance must be analyzed for exact imitation. This analysis can easily be made even more difficult by mixing the various luminescent inks or printing them on in overlapping arrangement.

Further advantageous embodiments will be explained with reference to the figures. For the sake of clarity the representations in the figures are not true to scale or to proportion.

DESCRIPTION OF THE PREFERRED EMBODIMENTS

Figure 1:
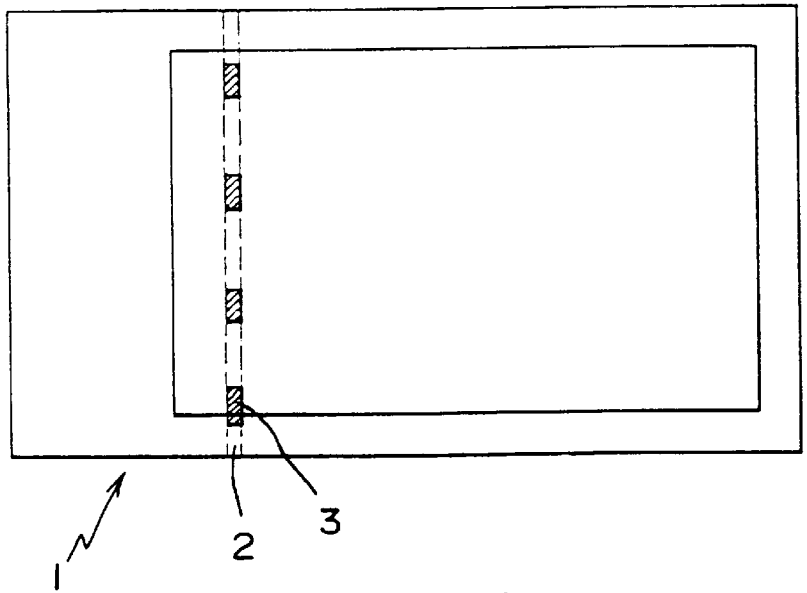
FIG. 1 shows an inventive security document.

FIG. 1 shows an inventive security document, bank note 1 here, in which window safeguarding thread 2 is embedded so as to pass directly to the document surface in certain areas 3. However it is also possible to embed the thread, depending on the width and desired effect, completely in the document or to anchor it in the document so that it appears as a stripe visible over the total width of the document. In the following the various embodiments of security element 2 will be explained in more detail.

Figure 2:
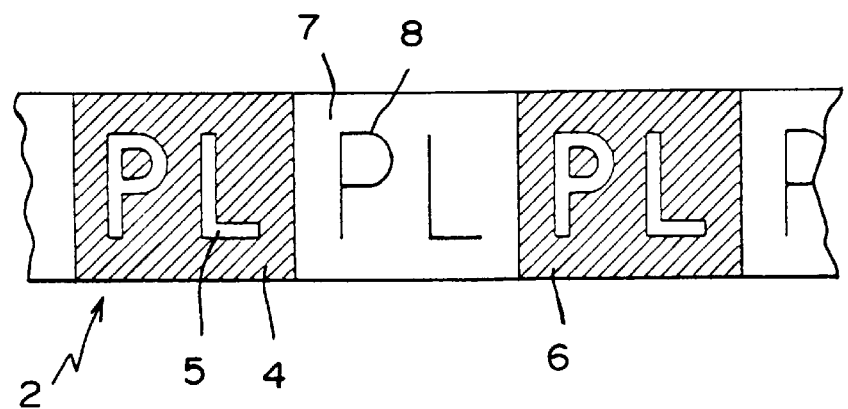
FIGS. 2 to 7 show various variants of a first preferred embodiment of the inventive security element.

FIG. 2 shows one of the preferred embodiments of inventive security element 2. It consists of transparent plastic layer 6 provided in some areas with metallic coating 4 having gaps 5 in the form of characters or patterns. In metal-free intermediate areas 7 there is print 8 which can have any desired color design. For example one can design the thread in a nationally specific way, the flag of the particular country being represented in a multicolor positive print in accordance with the original, and the name of the country in metallic negative print. This information is applied according to the invention several times and in alternating order along the thread.

Figure 3:
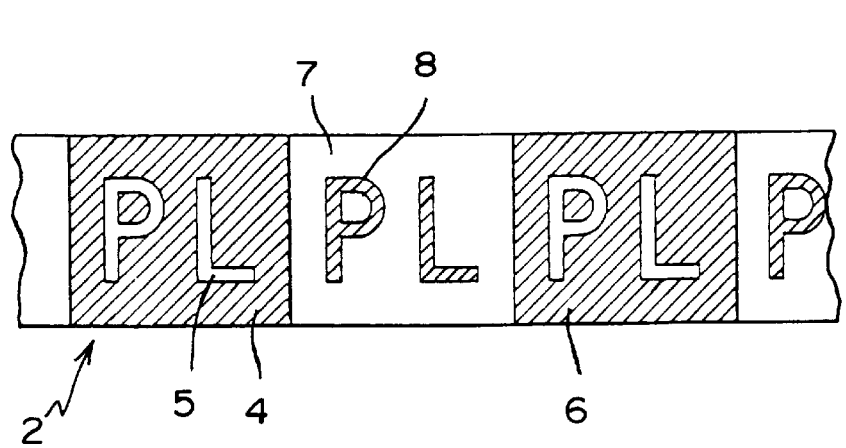

However, for positive print 8 one can also use metallic or metallic-looking inks. Such a thread variant is shown in FIG. 3. Positive writing 8 can be applied e.g. with a silvery ink. It is also possible to print negative writing 4, 5 with any desired opaque inks. Alternatively both pieces of information can be represented by a metallic coating. In this case not only background 4 of the negative writing consists of metal but also positive writing 8.

Figure 4:
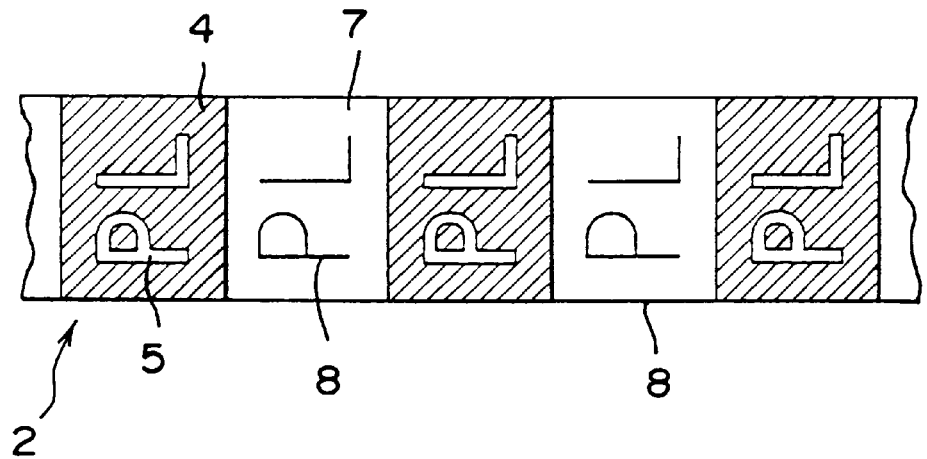

Particularly with wide threads (as of about 4 millimeters) characters 5, 8 can also be disposed transversely to the running direction of the thread, as shown in FIG. 4. This increases the readability of the characters in the window areas and their resistance to forgery since a certain number of repeats per window are visible depending on the type height and this appearance can only be imitated with great effort.

Figure 5:
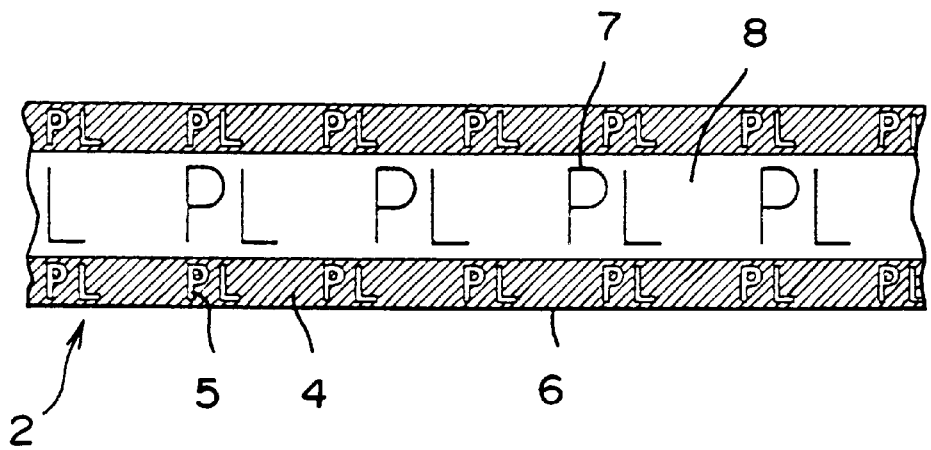

According to a further variant it is also possible to dispose metallic and metal-free areas in parallel stripes. This embodiment is shown in FIG. 5. Here print 8 is applied in the center of the thread and negative writing 4, 5 disposed symmetrically thereto in the edge areas. The reverse case is of course likewise possible: the printed positive writing framing the negative writing disposed in the center. The metallic background of the negative writing extending over the total length of the thread permits the thread to be easily found in the paper. Furthermore the large characters are relatively easy to recognize, while the small characters are more difficult to recognize visually but also more difficult to imitate.

Figure 6:
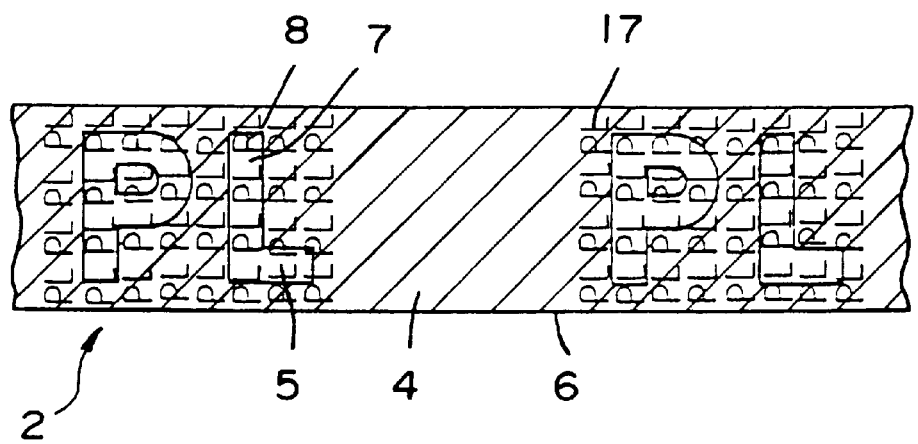

FIG. 6 shows another possibility for disposing the two pieces of information relative to each other. Here the two pieces of information are disposed one above the other by providing one side of the thread material with relatively large negative writing 4, 5 and the opposite surface with small print 8 that is recognizable in the gaps of the negative writing. The negative characters are still easy to recognize. Although the microprint is more difficult to resolve visually, it produces an optical impression that is very difficult to imitate, especially since the microprint shows through in the metallic areas as matte area 17.

Figure 7:
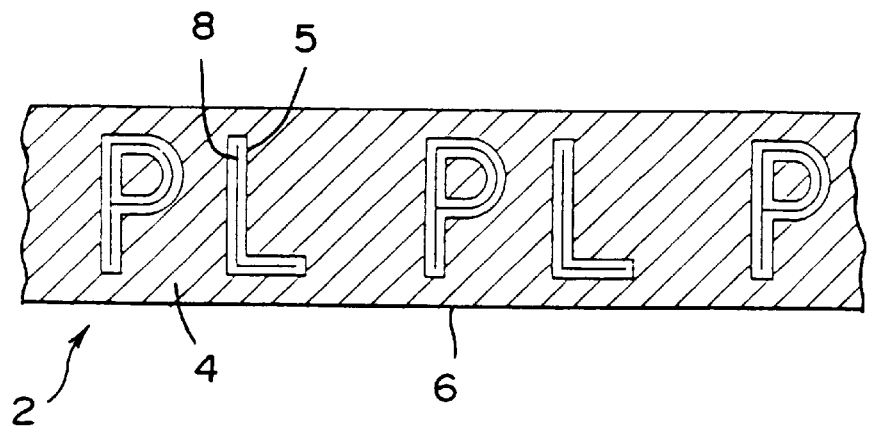

Alternatively the print and the gaps in the metalization can have the same form so that they can be disposed one within the other (FIG. 7). This means that gaps 5 in metal layer 4 simultaneously constitute intermediate areas 7 in which print 8 is applied.

These safeguarding threads are produced by the above-described method starting out with a transparent or at least translucent film. The film can have an inherent color or be printed with a translucent ground color layer that might be mixed additionally with luminescent substances.

Figure 8:
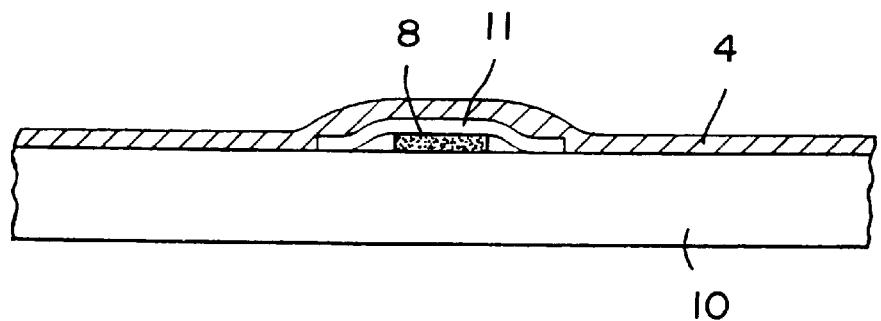
FIG. 8 shows the layer structure during production of the security element according to FIG. 7, FIGS. 9 to 12 show various variants of a second preferred embodiment of the inventive security element.

FIG. 8 shows the layer structure of prepared plastic film 10 as is used in the production of thread 2 according to FIG. 7. Sheet-shaped film 10 is first provided with latently visually and/or machine readable positive writing 8. The line width can be for example 100 microns and the type height about 1 millimeter. Further print 11 corresponding in its dimensions to the later negative writing is applied over this positive writing. In this example the line width is about 300 microns and the selected type height about 1.5 millimeters. Film 6 is then given all-over metalization 4 that is deposited on film 10 for example by the vacuum metalizing method. In a suitable solvent bath ink layer 11 is now removed together with the metalization thereabove so that print 8 becomes visible. In a last step film 10 is cut into strips of the-desired width, e.g. 2 millimeters, and stored on rolls until it is incorporated in the document material. In the present example the thread material is brought to the wire during papermaking and woven there into the forming paper web preferably as a window thread. The other thread variants shown are produced by analogous methods.

When selecting the inks one should of course make sure that the ink used for printing the positive writing is not attacked by the solvent bath.

Figure 9:
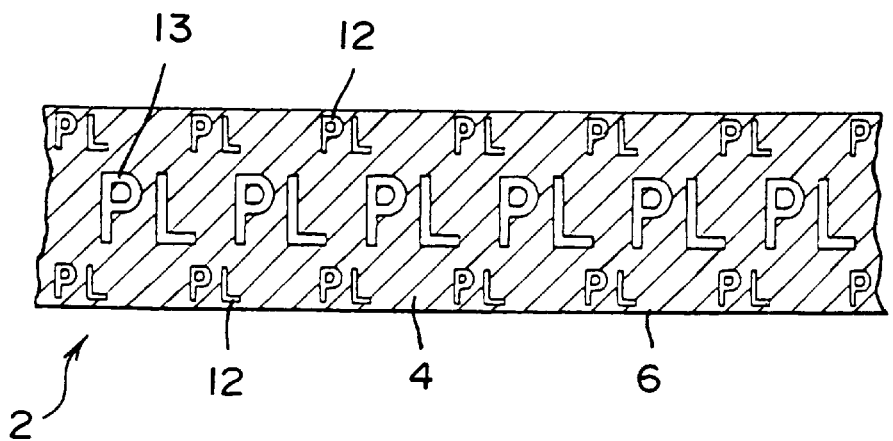

A further embodiment of inventive security element 2 is shown in FIG. 9. According to FIG. 9 small negative characters 12 difficult to recognize visually in incident light are located symmetrically to the center of the thread in the edge areas, relative to the thread width, while relatively large, easy-to-read negative characters 13 are placed in the center. At a thread width of 4 millimeters the type height of these large characters can be e.g. 1.5 millimeters with a line width of about 300 microns, while the small writing in the edge areas can have a type height of about 0.75 millimeters and a line width of about 100 microns.

Figure 10:
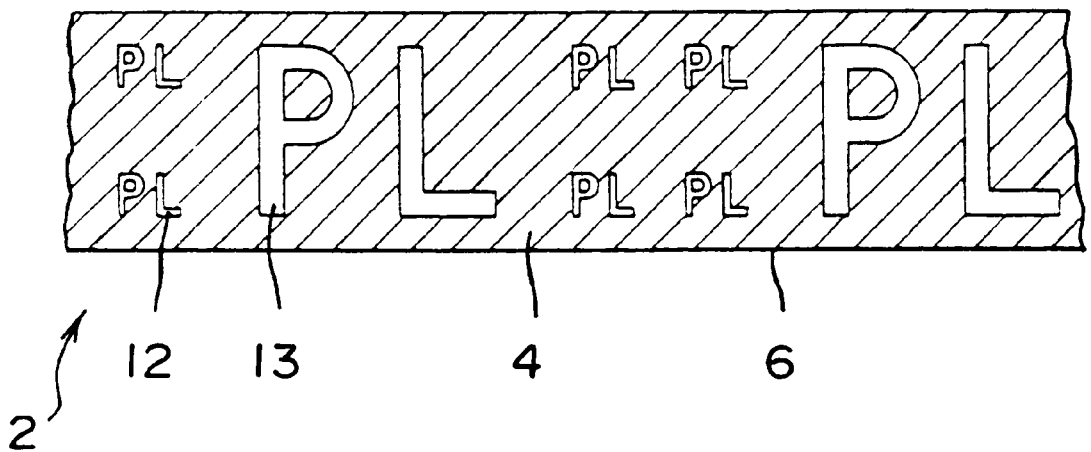

However the areas with small and large negative characters 12, 13 can also be disposed alternatingly along the running direction of the thread, as shown in FIG. 10.

Figure 11:
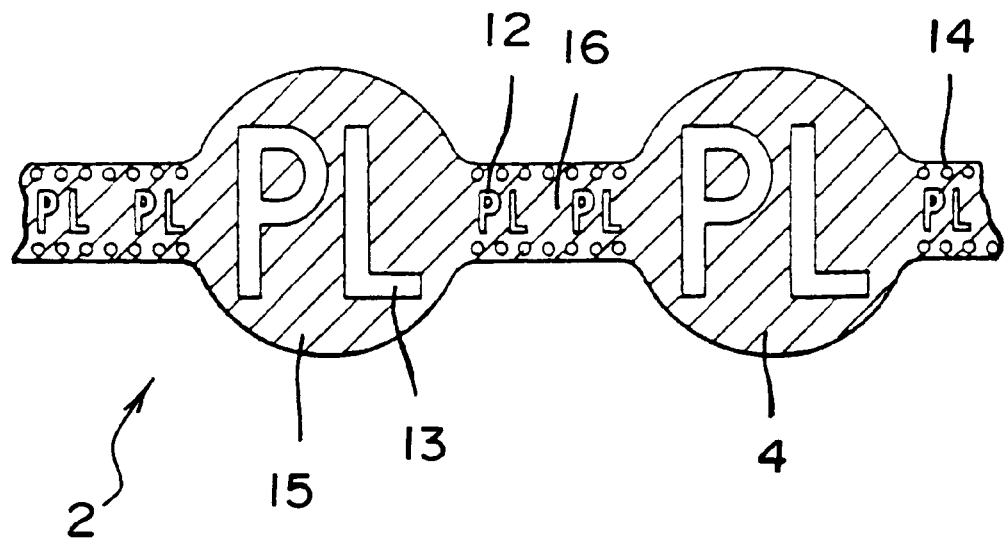

In a further variant the shape of the thread can also be changed in addition to the type size. A possible embodiment is shown in FIG. 11. The thread width varies here periodically, regarded in the running direction. Large writing 13 is disposed in widened areas 15 while small writing 12 is found in narrower bar areas 16. Bar areas 16 are preferably embedded in the document material and thus ensure the necessary anchoring in the document. Alternatively they can be provided for this purpose with additional perforations 14.

These thread variants can be produced by the above-described washing process or by another known demetalizing method, e.g. one of the methods described in EP-A 0 330 733 to which reference is explicitly made in this connection. It is also possible to print on the negative writing with bronze inks or metallically lustrous inks.

Line thicknesses and type heights of very small dimensions can be produced so that the eye can hardly resolve them. In this case a check can only be done by machine. However a machine check is also possible with all other thread variants according to the invention.

Figure 12:
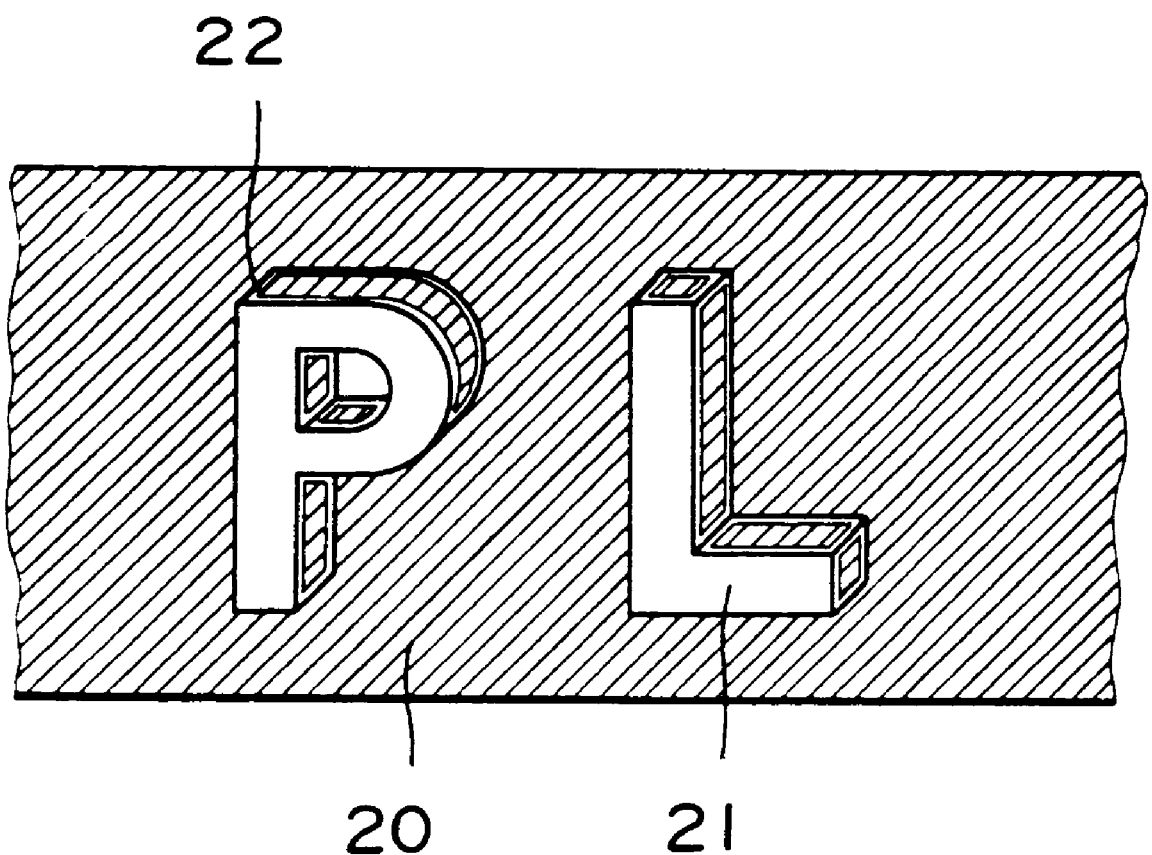

In all embodiments described above, the imitability of the writing can be increased even further by providing the applied information with a shadow edge, creating the impression of three-dimensionality. FIG. 12 shows a corresponding embodiment. For reasons of clarity only an area of the inventive safeguarding thread with negative writing is shown here greatly enlarged. To make the visual effect of this variant clear, opaque background coating 20 is shown all-over in this example and not hatched as in the preceding figures. In this case metallic coating 20 has a gap not only in the area of character 21 but also in area 22. The special linear form of gaps 22 corresponding to the contours of a shadow creates the impression that the character has a certain depth. Such quasi three-dimensional characters or patterns can be produced both by the described demetalizing method and by printing technology. The three-dimensional impression can of course also be created inversely for characters represented in positive print.

What is claimed is:

1. A security element for an antifalsification paper in the form of a band that comprises a translucent plastic film with an opaque coating extending partially over the plastic film leaving non-coated areas, the coating having gaps in the form of visually and/or machine readable characters or patterns forming a first information; and a second information in the form of visually and/or machine readable characters or patterns disposed on non-coated areas of the plastic film, wherein the second information is represented as positive writing covering less than the non-coated areas of the plastic film, to thereby leave non-coated areas of the plastic film adjacent each area bearing said second information.

2. The security element of claim 1 wherein the second information is printed information.

3. The security element of claim 2 wherein the second information is printed with a metallic or metallic looking ink.

4. The security element of claim 1 wherein the second information is a metallic coating.

5. A security element for an antifalsification paper in the form of a band that comprises a translucent plastic film with an opaque coating extending at least partially over the plastic film, the coating having gaps in the form of characters or patterns forming a first information wherein the first information is visually readable without additional aids; the coating having gaps in the form of visually and/or machine readable characters or patterns disposed on the plastic film forming a second information, wherein the second information is smaller in size than said first information and visually difficult to resolve because of its smaller size compared to the first information.

6. The security element of claim 1 or 5 wherein the first and second information are disposed alternatingly along the security element.

7. The security element of claim 1 or 5 wherein the first and second information are disposed parallel to each other along the security element.

8. The security element of claim 1 or 5 wherein the security element has a running direction and the width of the security element varies with respect to the running direction of the security element.

9. The security element of claim 1 or 5 wherein the opaque coating is a metallic looking print or a vacuum metallization.

10. A method for producing the security element of claim 2, comprising the steps of: providing a translucent plastic film; printing an information corresponding to the second information in the form of visually and/or machine readable characters or patterns on the plastic film using an insoluble ink; printing another information corresponding to the first information in the form of latently visually and/or machine readable characters or patterns on said plastic film using a soluble ink; providing the thus printed film with an opaque coating; dissolving the soluble ink using solvents in a solution bath to remove the part of the opaque coating covering said soluble ink to produce visible and/or machine readable characters or patterns corresponding to the first information where said latently visually and/or machine readable characters or patterns were located on said plastic film and cutting the thus prepared film into security elements of predetermined width.

11. The method of claim 10 including printing the insoluble ink corresponding to the second information first and then applying the soluble ink corresponding to the first information over the insoluble ink.

12. The method of claim 10 including applying the soluble ink and insoluble ink in one printing operation.

13. The method of claim 10 including applying the opaque coating by printing.

14. The method of claim 10 including using a metal layer for the opaque coating wherein that metal layer is deposited by a vacuum metallization process or printed using metallic or metallic looking inks.

* * * * *